United States Patent
Moon et al.

(10) Patent No.: US 9,136,537 B2
(45) Date of Patent: Sep. 15, 2015

(54) RECHARGEABLE LITHIUM BATTERY INCLUDING HEAT-TREATED NEGATIVE CURRENT COLLECTOR

(75) Inventors: Sung-Hwan Moon, Yongin-si (KR); Jae-Hyuk Kim, Yongin-si (KR); Hee-Young Chu, Yongin-si (KR); Jong-Seo Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 531 days.

(21) Appl. No.: 12/914,827

(22) Filed: Oct. 28, 2010

(65) Prior Publication Data

US 2011/0287322 A1    Nov. 24, 2011

(30) Foreign Application Priority Data

May 24, 2010  (KR) ........................ 10-2010-0048116

(51) Int. Cl.
*H01M 4/64* (2006.01)
*H01M 4/68* (2006.01)
*H01M 4/70* (2006.01)
*H01M 4/72* (2006.01)
*H01M 4/66* (2006.01)
*H01M 10/052* (2010.01)

(52) U.S. Cl.
CPC ............ *H01M 4/661* (2013.01); *H01M 10/052* (2013.01); *Y02E 60/122* (2013.01)

(58) Field of Classification Search
CPC ........... H01M 4/64; H01M 4/66; H01M 4/70; H01M 4/72

USPC .......................................... 429/245
See application file for complete search history.

(56) References Cited

U.S. PATENT DOCUMENTS

| | | | |
|---|---|---|---|
| 8,097,365 B2 | 1/2012 | Iwama et al. | |
| 2004/0072079 A1* | 4/2004 | Hashimoto et al. | 429/245 |
| 2005/0244711 A1 | 11/2005 | Fukui et al. | |
| 2008/0220338 A1* | 9/2008 | Iwama et al. | 429/338 |
| 2009/0061326 A1* | 3/2009 | Hirose et al. | 429/338 |
| 2010/0136434 A1 | 6/2010 | Hanafusa | |

FOREIGN PATENT DOCUMENTS

| | | |
|---|---|---|
| JP | 09-115523 | 5/1997 |
| JP | 2000-208149 | 7/2000 |
| JP | 2001-283862 A | 10/2001 |
| JP | 2005-123183 | 5/2005 |
| KR | 100264387 | 5/2000 |
| KR | 10-2005-0027224 | 3/2005 |
| KR | 10-2007-0122385 | 12/2007 |
| KR | 1020080002651 | 1/2008 |
| KR | 1020080103438 | 11/2008 |
| KR | 1020090125823 | 12/2009 |

OTHER PUBLICATIONS

Takagi et al., Machine translation of JP 2000-208149 A, Jul. 2008.*
(Continued)

*Primary Examiner* — Sean P Cullen
(74) *Attorney, Agent, or Firm* — Robert E. Bushnell, Esq.

(57) ABSTRACT

Disclosed is a rechargeable lithium battery including: a positive electrode; a negative electrode including a negative current collector including a copper foil having elongation of about 5% to about 10% and a particle size of about 1 μm to about 20 μm, and a negative active material layer provided on the negative current collector; and an electrolyte solution.

5 Claims, 9 Drawing Sheets

(56) References Cited

OTHER PUBLICATIONS

Korean Notice of Allowance issued Apr. 30, 2012 in connection with Korean Patent Application Serial No. 10-2010-0048116 and Request for Entry of the Accompanying Office Action attached herewith.

The Korean Office action issued by Korean Patent Office on Sep. 20, 2011, corresponding to KR 10-2010-0048116 and Request for Entry attached herewith.

* cited by examiner

FIG. 9

Mixing the active material, a conductive material, and a binder to provide an active material composition

↓

Coating the composition on a current collector

RECHARGEABLE LITHIUM BATTERY INCLUDING HEAT-TREATED NEGATIVE CURRENT COLLECTOR

CLAIM OF PRIORITY

This application claims priority to and the benefit of Korean Patent Application No. 10-2010-0048116 filed in the Korean Intellectual Property Office on May 24, 2010, the entire contents of which are incorporated herein by reference.

BACKGROUND OF THE INVENTION

1. Field of the Invention

This disclosure relates to a rechargeable lithium battery.

2. Description of the Related Art

Lithium rechargeable batteries have recently drawn attention as a power source of small portable electronic devices. They use an organic electrolyte solution and thereby have twice the discharge voltage of a conventional battery using an alkali aqueous solution, and accordingly have high energy density.

This rechargeable lithium battery is used by injecting an electrolyte into a battery cell including a positive electrode including a positive active material that can intercalate and deintercalate lithium and a negative electrode including a negative active material that can intercalate and deintercalate lithium.

On the other hand, in the case of the negative current collector of a copper foil, shards of copper foil are scattered on a plate during the cutting process for fabricating a negative electrode, so that it causes an open circuit voltage (OCV) imperfection during the battery process.

SUMMARY OF THE INVENTION

One aspect of the present invention is to provide a rechargeable lithium battery including a negative current collector in which an open circuit voltage imperfection is decreased by decreasing brittleness.

According to one aspect of the present invention, a rechargeable lithium battery is provided that includes: a positive electrode; a negative electrode including a negative current collector having elongation of about 5% to about 10% and a particle size of about 1 μm to about 20 μm and a negative active material layer provided on the negative current collector; and an electrolyte solution.

The elongation may range from about 6% to about 8%, and the particle size may range from about 1 μm to about 7 μm.

The copper foil may have a tensile strength from about 300 MPa to about 350 MPa.

The copper foil may be obtained by heating at about 70° C. to about 200° C.

The detailed specifications of other aspects of the present invention are included in the following detailed description.

The present invention may decrease an open circuit voltage imperfection while fabricating a rechargeable lithium battery by decreasing the brittleness of a negative current collector, and thereby it may reduce cost.

BRIEF DESCRIPTION OF THE DRAWINGS

FIG. 9 is a flowchart showing the preparation of an electrode according to an embodiment of the present invention.

DETAILED DESCRIPTION OF THE INVENTION

Exemplary embodiments of this disclosure will hereinafter be described in detail. However, these embodiments are only exemplary, and this disclosure is not limited thereto.

When a specific definition is not otherwise provided, the term "brittleness" indicates a condition in which a material may be broken, while showing little plastic deformation, when receiving an extraneous force.

Figure 1:
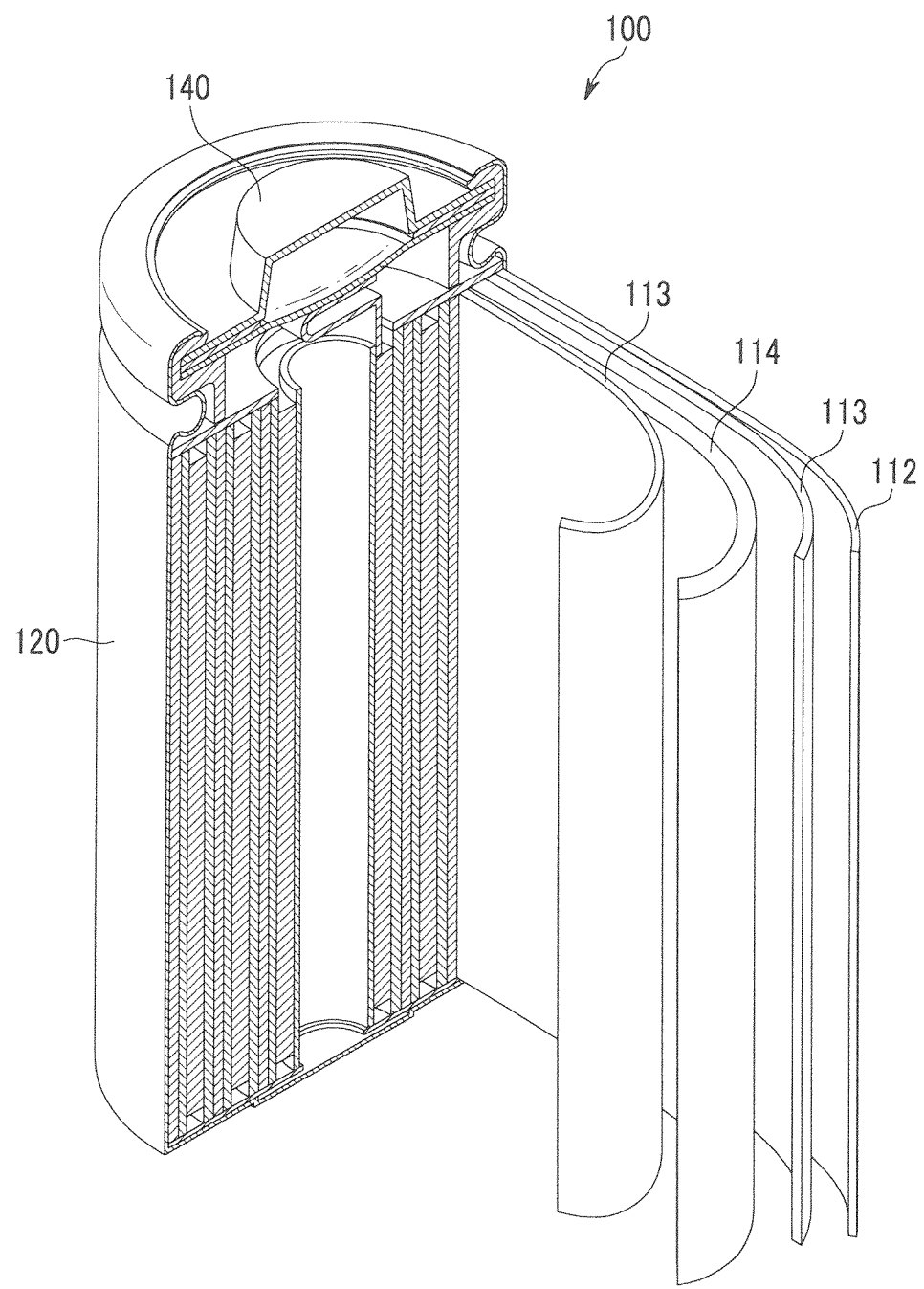
FIG. 1 is a schematic view of a rechargeable lithium battery according to one embodiment.
Figure 2:
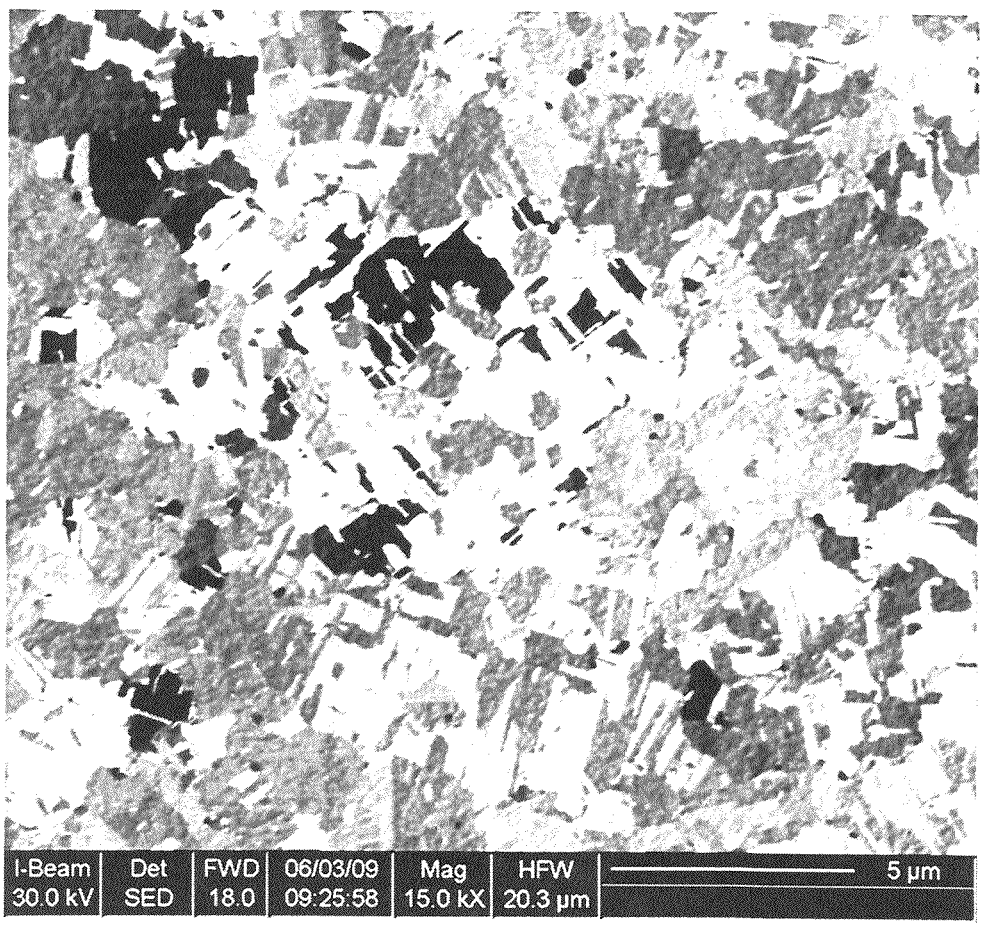
FIGS. 2 to 5 are respectively microstructure SEM photographs of copper foils obtained from Examples 1 to 4.
Figure 3:
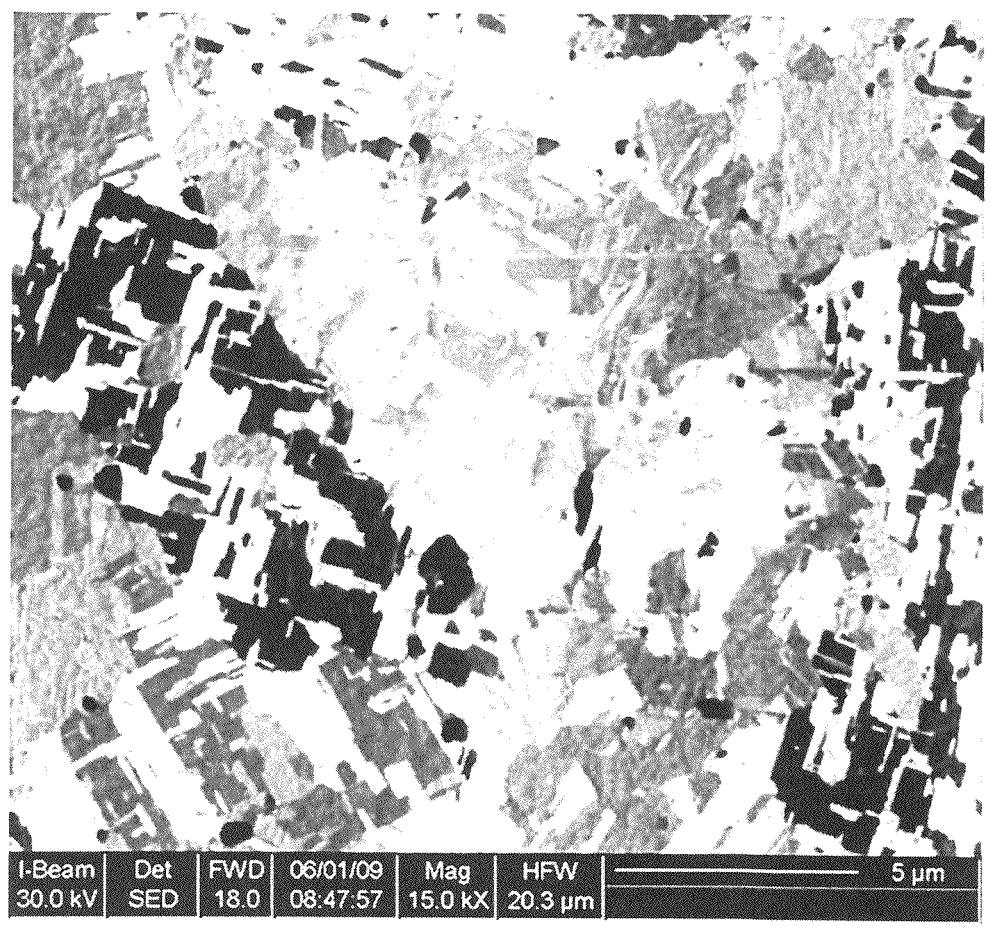
Figure 4:
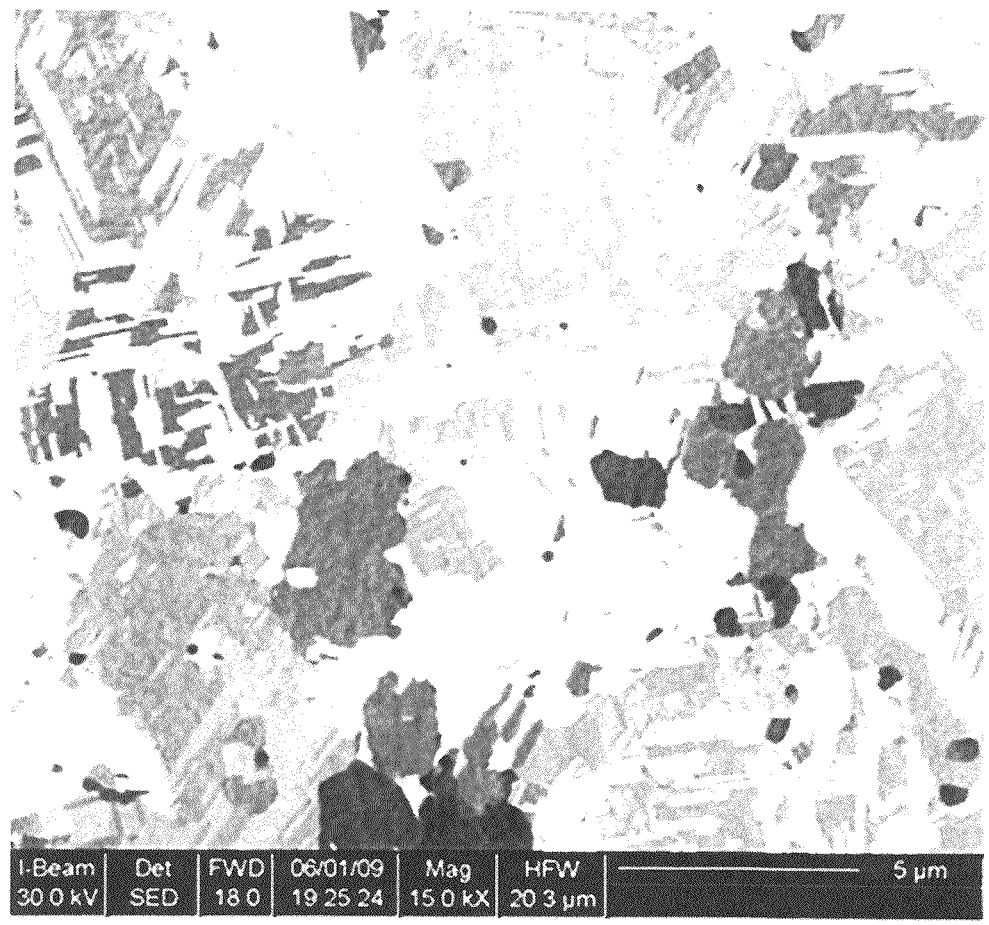
Figure 5:
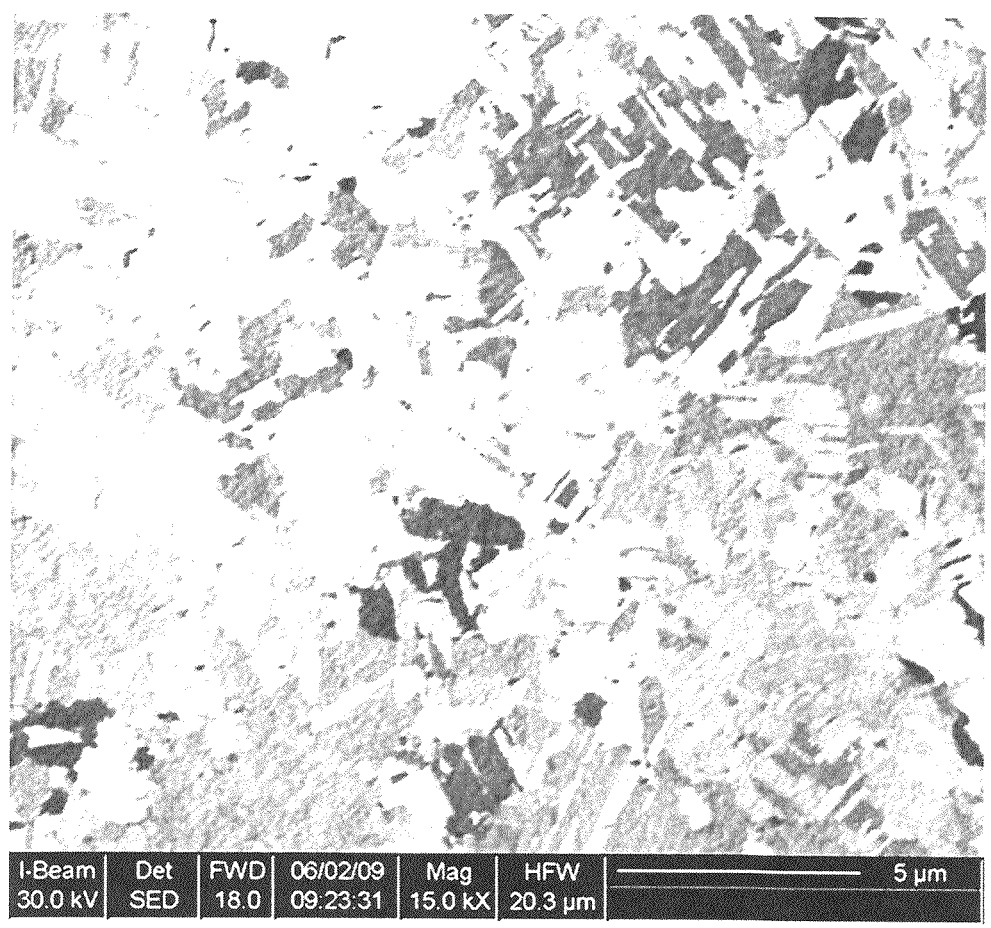

The rechargeable lithium battery according to one embodiment is described referring to FIG. 1.

FIG. 1 is a schematic view of a rechargeable lithium battery according to one embodiment.

FIG. 1 illustrates a rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120.

The negative electrode 112 includes a negative current collector and a negative active material layer disposed on the negative current collector The current collector may include a copper foil.

The copper foil is generally composed of small-sized grains of about 1 μm or less when analyzing a microstructure thereof using a scanning electron microscope (SEM). In addition, the tensile strength and the elongation of copper foil may be simultaneously analyzed using a universal testing machine. Generally, the tensile strength ranges from about 500 MPa to about 700 MPa, and the elongation ranges from about 1% to about 3%. It is understood that the brittleness of the copper foil is very high considering the particle size, the tensile strength, and the elongation, so it may be easily broken by an extraneous force into small pieces.

According to one embodiment, the copper foil having high brittleness is heated to decrease the brittleness and then applied to a negative current collector.

The heat treatment may be performed by using a resistance furnace, an electric oven, a halogen lamp, or the like, or by using infrared heat.

The heat treatment may be performed at about 70° C. to about 200° C., and for example at about 90° C. to about 150° C. When the heat treatment is performed within the temperature range, it may prevent the deformation of the copper foil or surface oxidation thereof, and may decrease the brittleness of the copper foil.

According to one embodiment, the copper foil may have elongation ranging from about 5% to about 10%, and for example from about 6% to about 8%. When the copper foil has elongation within the range, shards of copper foil are rarely scattered and the peripheral cutting area is rarely plastically deformed, so it may be easily handled.

According to one embodiment, the copper foil may have a particle size ranging from about 1 μm to about 20 μm, and for example from about 1 μm to about 7 μm. When the copper foil has a particle size within the range, shards of copper foil are rarely scattered and the peripheral cutting area is rarely plastically deformed, so that it can be easily handled.

The copper foil may have tensile strength of about 300 MPa to about 350 MPa, and for example of about 315 MPa to about 345 MPa. When the copper foil has tensile strength within the range, shards of copper foil are rarely scattered and the peripheral cutting area is rarely plastically deformed, so it may be easily handled.

Since the negative current collector according to one embodiment includes a copper foil having decreased brittleness, it may decrease open circuit voltage (OCV) imperfections while fabricating a rechargeable lithium battery.

The negative active material layer includes a negative active material, a binder, and optionally a conductive material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material in a lithium ion rechargeable battery. Examples of the carbon material include crystalline carbon, amorphous carbon, and a mixture thereof. The crystalline carbon may be non-shaped, or may be sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ ($0<x<2$), a Si—Y alloy (where Y is an element selected from the group consisting of an alkali metal, an alkaline-earth metal, a group 13 element, a group 14 element, a transition element, a rare earth element, and combinations thereof, and is not Si), Sn, $SnO_2$, Sn—Y (where Y is an element selected from the group consisting of an alkali metal, an alkaline-earth metal, a group 13 element, a group 14 element, a transition element, a rare earth element, and combinations thereof and is not Sn), or mixtures thereof. At least one of these materials may be mixed with $SiO_2$. The element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

The binder improves binding properties of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material unless it causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

The positive electrode 114 includes a current collector and a positive active material layer disposed on the current collector. The positive active material layer includes a positive active material, a binder, and optionally a conductive material.

The current collector may be aluminum (Al), but is not limited thereto.

The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used:

$Li_aA_{1-b}B_bD_2$ (wherein, in the above chemical formula, $0.90 \leq a \leq 1.8$ and $0 \leq b \leq 0.5$); $Li_aE_{1-b}B_bO_{2-c}D_c$ (wherein, in the above chemical formula, $0.90 \leq a \leq 1.8$, $0 \leq b \leq 0.5$ and $0 \leq c \leq 0.05$); $LiE_{2-b}B_bO_{4-c}D_c$ (wherein, in the above chemical formula, $0 \leq b \leq 0.5$ and $0 \leq c \leq 0.05$); $Li_aNi_{1-b-c}Co_bB_cD_\alpha$ (wherein, in the above chemical formula, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein, in the above chemical formula, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein, in the above chemical formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein, in the above chemical formula, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein, in the above chemical formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein, in the above chemical formula, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, in the above chemical formula, $0.90 \leq a \leq 1.8$, $0 \leq b \leq 0.9$, $0 \leq c \leq 0.5$, and $0.001 \leq d \leq 0.1$); $Li_aNi_bCO_cMn_dG_eO_2$ (wherein, in the above chemical formula, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2G_bO_4$ (wherein, in the above chemical formula, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compound can have a coating layer on the surface, or can be mixed with a compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compounds for a coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in a method having no negative influence on properties of a positive active material by including these elements in the compound. For example, the method may include any coating method such as spray coating, dipping, and the like, but is not illustrated in more detail, since it is well-known to those who work in the related field.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used in order to improve conductivity of an electrode. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The negative electrode 112 and the positive electrode 114 may be manufactured by a method including mixing the active material, a conductive material, and a binder to provide an active material composition, and coating the composition on a current collector. The negative electrode 112 includes a current collector of a copper foil having decreased brittleness according to one embodiment.

The electrode manufacturing method is well known, and thus is not described in detail in the present specification. The solvent can be N-methylpyrrolidone, but it is not limited thereto.

The electrolyte solution includes a non-aqueous organic solvent and a lithium salt.

The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When a linear carbonate compound and a cyclic carbonate compound are mixed with each other, the dielectric constant increases and the viscosity decreases. The cyclic carbonate compound and linear carbonate compound are mixed together in the volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte may further include an overcharge-inhibiting compound such as ethylene carbonate, pyrocarbonate, and the like.

The lithium salt supplies lithium ions in the battery, and performs a basic operation of a rechargeable lithium battery and improves lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), $LiCl$, $LiI$, and $LiB(C_2O_4)_2$ (lithium bisoxalate borate, LiBOB), or a combination thereof.

The lithium salt may be used at a concentration ranging from about 0.1 to about 2.0M. When the lithium salt is included at the concentration range, electrolyte performance and lithium ion mobility may be enhanced due to optimal electrolyte conductivity and viscosity.

The separator 113 may be formed as a single layer or a multilayer, and may be made of polyethylene, polypropylene, polyvinylidene fluoride, or a combination thereof.

The following examples illustrate this disclosure in more detail. These examples, however, are not in any sense to be interpreted as limiting the scope of this disclosure.

Furthermore, what is not described in this specification can be sufficiently understood by those who have knowledge in this field and will not be illustrated here.

EXAMPLES

Fabricating Negative Current Collector

Example 1

A copper foil is heated in an electric oven at 90° C. for 90 seconds to provide a negative current collector.

Example 2

A copper foil is heated in an electric oven at 110° C. for 90 seconds to provide a negative current collector.

Example 3

A copper foil is heated in an electric oven at 130° C. for 90 seconds to provide a negative current collector.

Example 4

A copper foil is heated in an electric oven at 150° C. for 90 seconds to provide a negative current collector.

Comparative Example 1

A copper foil is used for a negative current collector without any heating process.

Comparative Example 2

A copper foil is heated in an electric oven at 50° C. for 90 seconds to provide a negative current collector.

Comparative Example 3

A copper foil is heated in an electric oven at 250° C. for 90 seconds to provide a negative current collector.

Experimental Example 1

Assessment of Elongation, Particle Size, and Tensile Strength of Copper Foil Each copper foil obtained from Examples 1 to 4 and Comparative Examples 1 to 3 is measured to determine elongation, particle size, and tensile strength according to the following method, and the results are shown in the following Table 1.

The particle size of copper is analyzed for microstructure using a scanning electron microscope (SEM). For example, the copper foil sample is cut into a square having a length and a width of 0.5 cm and mounted in a holder to perform a SEM analysis. The magnification was adjusted between 10,000 times to 20,000 times to observe one particle size.

The tensile strength and the elongation of copper foil are simultaneously measured using a universal testing machine. The sample is prepared to adjust the tensile strength measurement using a punch machine and fixed in a grip of a universal testing machine and automatically measured using a computer.

Figure 6:
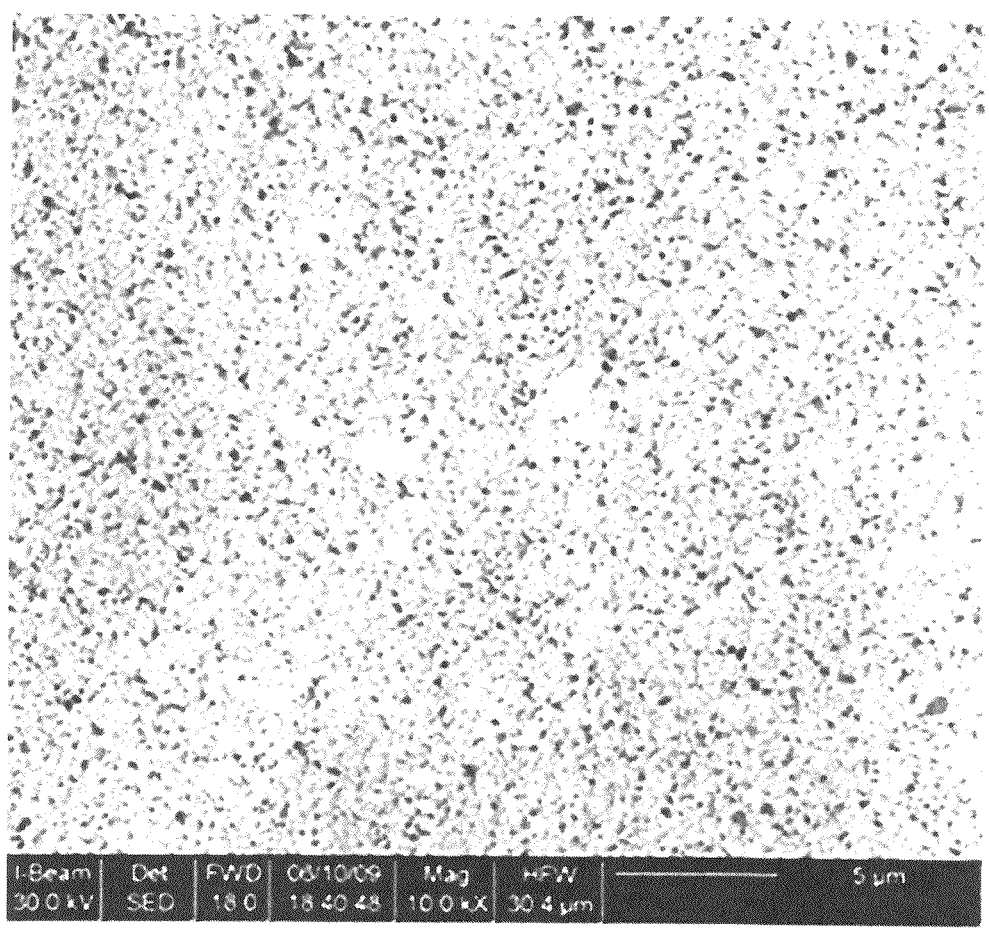
FIGS. 6 to 8 are respectively microstructure SEM photographs of copper foils obtained from Comparative Examples 1 to 3.
Figure 7:
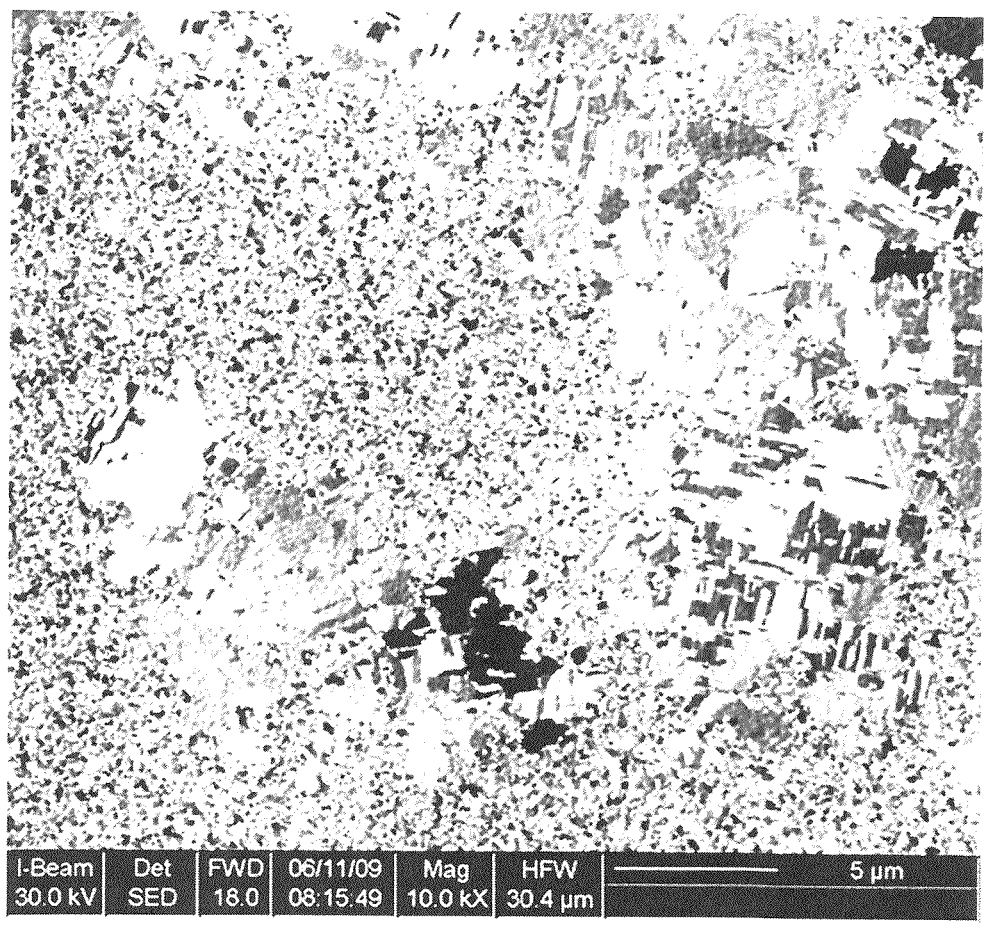
Figure 8:
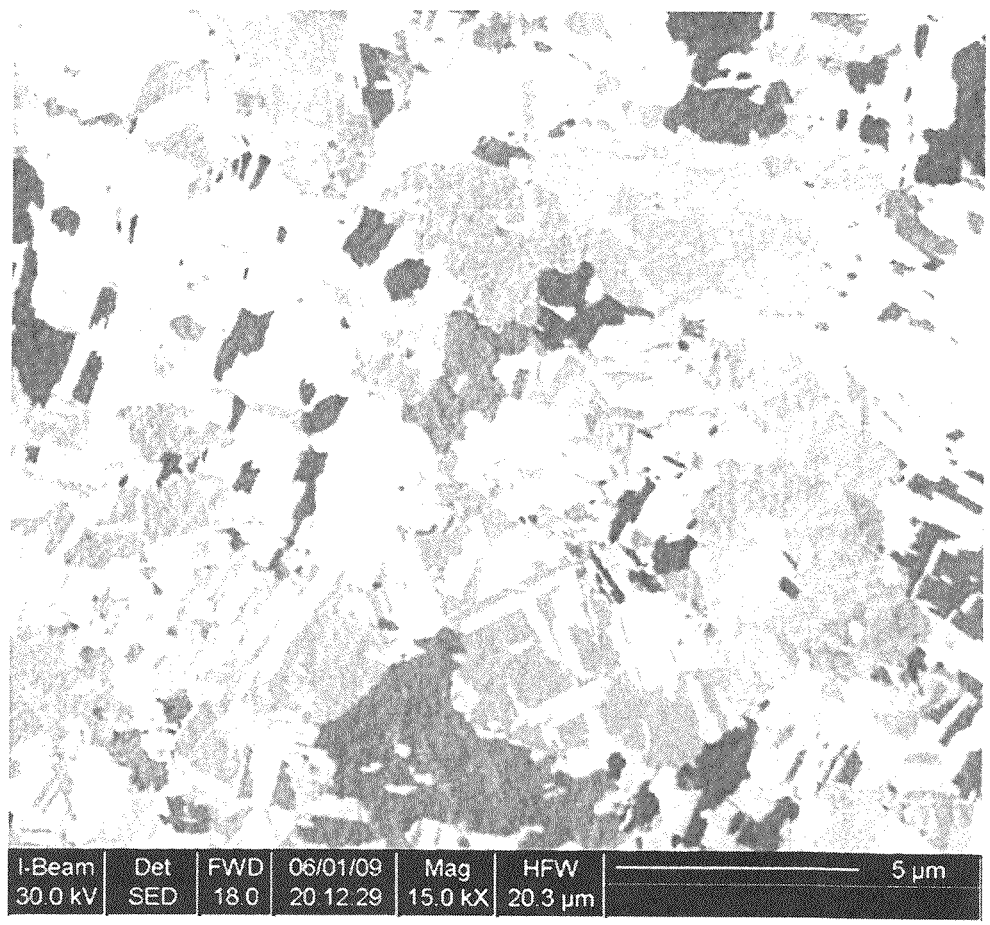

FIGS. 2 to 5 are respectively microstructure SEM photographs of copper foils obtained from Examples 1 to 4, and FIGS. 6 to 8 are respectively microstructure SEM photographs of copper foils obtained from Comparative Examples 1 to 3.

Referring to FIGS. 2 to 8 and the following Table 1, the negative current collectors of Examples 1 to 4 obtained by the heating treatment have elongation, particle size, and tensile strength within the appropriate ranges set by one embodiment, so it is understood that the brittleness is decreased.

On the other hand, the negative current collector obtained from Comparative Example 1 that is heat treated includes only particles having a size of less than 1 μm and the elongation is out of the appropriate range, so the cutting surface is plastically deformed during the process to provide difficulties of working and handling.

The negative current collector obtained from Comparative Example 2 that is heat treated at 50° C. includes particles grown to 1 μm or more, but also includes particles having a particle size of less than 1 μm. In addition, the elongation is out of the appropriate range as shown in the following Table 1.

Furthermore, the negative current collector from Comparative Example 3 obtained by the heating treatment at 250° C. has a particle size within the appropriate range set by one embodiment, but the elongation is out of appropriate range set by one embodiment.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Elongation (%) | 6.44 | 6.71 | 7.3 | 7.5 | 2.72 | 4.23 | 11.54 |
| Particle size (μm)* | 2.04 | 2.5 | 3.42 | 3.72 | less than 1 | — | 4.04 |
| Tensile strength (MPa) | 340.7 | 330 | 323.5 | 319.3 | 523 | 378 | 283.4 |

*particle size is an average of 10 particles randomly selected from the particles shown in the microstructure SEM photograph, but in Comparative Example 2, the average is not shown since particles having a size of less than 1 μm are mixed with particles of 1 μm or more.

Fabricating Rechargeable Lithium Cell 94 wt % of a negative active material of graphite, 3 wt % of a binder of polyvinylidene fluoride (PVDF), and 3 wt % of conductive material of acetylene black are mixed and dispersed in N-methyl-2-pyrrolidone to provide a slurry. Then the slurry is coated on a glass plate to provide a negative active material layer. The negative active material layer is coated on the negative current collector obtained from each of Examples 1 to 4 and Comparative Examples 1 to 3 to provide a negative electrode.

94 wt % of a positive active material of $LiCoO_2$, 3 wt % of a binder of polyvinylidene fluoride (PVDF), and 3 wt % of a conductive material of acetylene black are mixed and dispersed in N-methyl-2-pyrrolidone to provide a slurry. Then the slurry is coated on a glass plate to provide a positive active material layer. The positive active material layer is coated on an aluminum foil having a thickness of 15 μm to provide a positive electrode.

A cylindrical 18650 rechargeable lithium cell having a capacity of 1500 mAh is fabricated using the negative electrode and the positive electrode according to the general method. The electrolyte solution is prepared by dissolving $LiPF_6$ having a concentration of 1.3M in a mixed solvent of ethylene carbonate (EC) and dimethyl carbonate (DMC) in volume ratio of 3:7.

Experimental Example 2

Assessing Open Circuit Voltage (OCV) Imperfection of Rechargeable Lithium Battery Cell The rechargeable lithium cell including each negative current collector according to Examples 1 to 4 and Comparative Examples 1 to 3 is measured for OCV imperfection according to the following method, and the results are shown in the following Table 2.

The voltage difference between both electrodes of cell is measured using a multimeter to determine OCV (V), and it is considered as an imperfection when the OCV is 3V or less.

TABLE 2

|  | Examples | | | | Comparative Examples | | |
| --- | --- | --- | --- | --- | --- | --- | --- |
|  | 1 | 2 | 3 | 4 | 1 | 2 | 3 |
| OCV (V) | 3.18 | 3.24 | 3.15 | 3.06 | 2.21 | 2.73 | 2.88 |

It is confirmed that the rechargeable lithium cells fabricated using the copper foils obtained from Examples 1 to 4 rarely show the OCV imperfection compared to Comparative Examples 1 to 3. Since the copper foils according to Examples 1 to 4 have the elongation and the particle size within the appropriate range set by one embodiment, it may decrease the brittleness of copper foil, and the copper foil is rarely broken during a cutting process for fabricating a rechargeable lithium battery.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
   a positive electrode;
   a negative electrode comprising a current collector comprising a copper foil having elongation at break of about 6.44 to about 7.50 and a particle size of about 2.04 μm to about 3.72 μm, and a negative active material layer on the current collector; and
   an electrolyte solution.

2. A rechargeable lithium battery of claim 1, wherein the copper foil has tensile strength ranging from about 319.30 MPa to about 340.70 MPa.

3. A rechargeable lithium battery of claim 1, wherein the copper foil is obtained by heat treatment in the range of about 90° C. to about 150° C.

4. A rechargeable lithium battery of claim 1, wherein the voltage of the rechargeable lithium battery is considered as an imperfection when open circuit voltage (OCV) is 3V or less.

5. A rechargeable lithium battery of claim 1, wherein open circuit voltage (OCV) is between 3.06V and 3.24V.

* * * * *